US012782886B2

(12) United States Patent
Zhang et al.

(10) Patent No.: US 12,782,886 B2
(45) Date of Patent: Nov. 3, 2026

(54) AUTOMATIC OPTIMIZATION SYSTEM FOR TOLUENE CHLORINATION PARAMETER BASED ON DEEP LEARNING

(71) Applicant: HEBEI DAJING DATANG CHEMICAL EQUIPMENT CO., LTD, Hengshui City (CN)

(72) Inventors: Dajing Zhang, Hengshui City (CN); Junqing Li, Hengshui City (CN); Weihuan Chen, Hengshui City (CN); Jianzhi Feng, Hengshui City (CN); Xuepeng Chang, Hengshui City (CN)

(73) Assignee: HEBEI DAJING DATANG CHEMICAL EQUIPMENT CO., LTD, Hengshui City (CN)

( * ) Notice: Subject to any disclaimer, the term of this patent is extended or adjusted under 35 U.S.C. 154(b) by 331 days.

(21) Appl. No.: 18/614,924

(22) Filed: Mar. 25, 2024

(65) Prior Publication Data

US 2024/0329607 A1 Oct. 3, 2024

(30) Foreign Application Priority Data

Mar. 29, 2023 (CN) ........................ 202310317484.1

(51) Int. Cl.
*G05B 13/02* (2006.01)
*G06N 3/084* (2023.01)

(52) U.S. Cl.
CPC ......... *G05B 13/021* (2013.01); *G05B 13/029* (2013.01); *G06N 3/084* (2013.01)

(58) Field of Classification Search
CPC .................................................... G05B 13/021
See application file for complete search history.

(56) References Cited

U.S. PATENT DOCUMENTS 10,275,719 B2 * 4/2019 Talathi ..................... G06N 3/08
2021/0064988 A1 * 3/2021 Liu ......................... G06F 17/10
2021/0073612 A1 * 3/2021 Vahdat ................... G06N 3/063
2021/0224635 A1 * 7/2021 He ........................... G06N 3/09

FOREIGN PATENT DOCUMENTS

CN 106202946 A * 12/2016 ............... G06N 5/00
CN 108388762 A * 8/2018 ............... G06N 3/08
CN 115409169 A * 11/2022 ............... G06N 3/08

* cited by examiner

*Primary Examiner* — Suresh Suryawanshi
(74) *Attorney, Agent, or Firm* — Maine Cernota & Curran

(57) ABSTRACT

The present disclosure provides an automatic optimization system for a toluene chlorination parameter based on deep learning. The automatic optimization system for a toluene chlorination parameter based on deep learning includes a toluene chlorination data acquisition module, a toluene chlorination data preprocessing module, a toluene chlorination data division module, a toluene chlorination deep belief network (DBN) construction module, a toluene mass fraction prediction module, a toluene mass fraction validation module, and a toluene chlorination parameter optimization module. The automatic optimization system for toluene chlorination parameter provided by the present disclosure can realize a complete process including automatic detection, information processing, analysis and determination, operation control and expected goal implementation. While reducing manpower, the present disclosure improves the stability of the chemical reaction process, and improves the yield and purity of the target component.

8 Claims, 1 Drawing Sheet

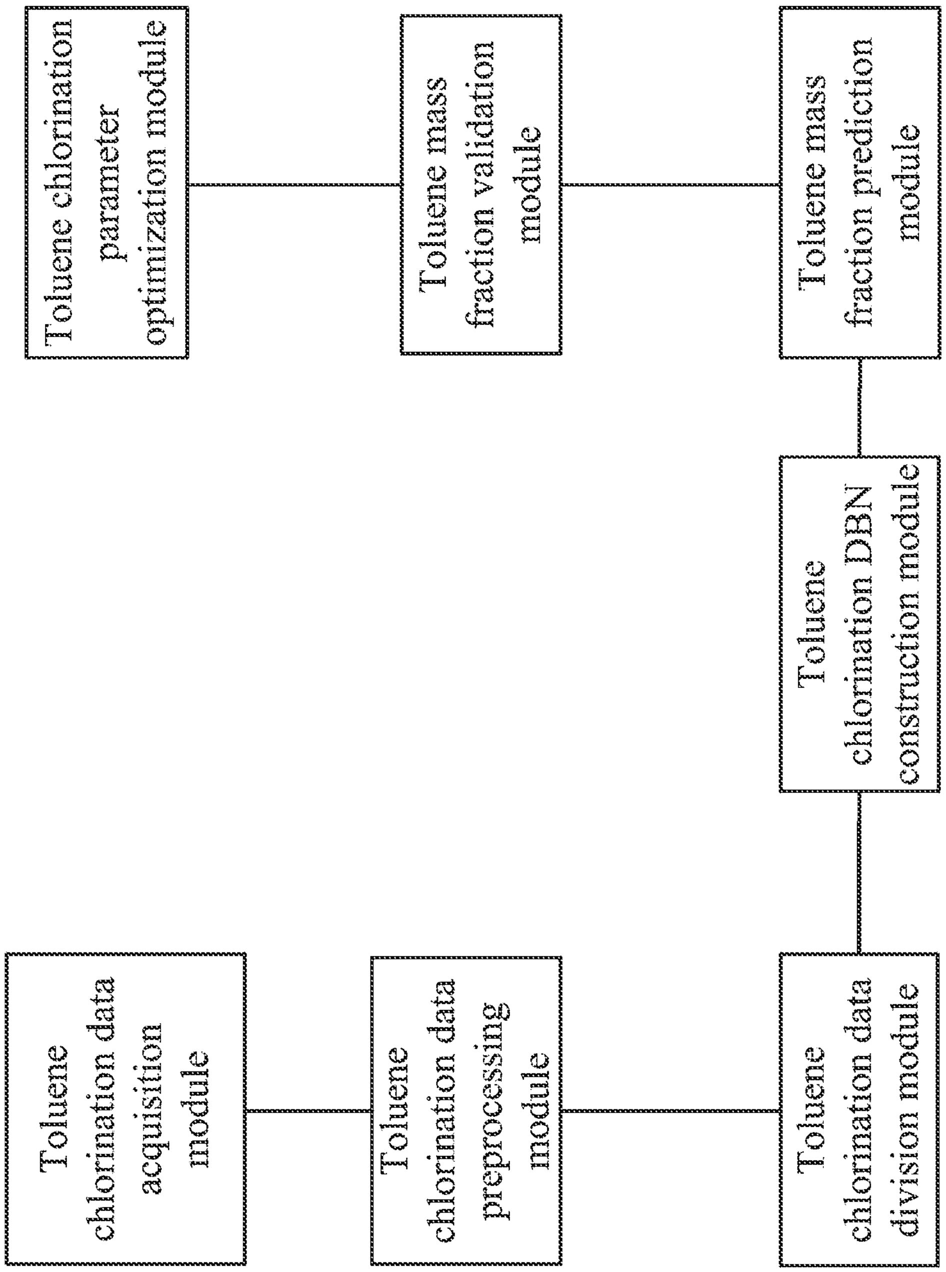
Toluene chlorination data acquisition module
Toluene chlorination data preprocessing module
Toluene chlorination data division module
Toluene chlorination DBN construction module
Toluene mass fraction prediction module
Toluene mass fraction validation module
Toluene chlorination parameter optimization module

AUTOMATIC OPTIMIZATION SYSTEM FOR TOLUENE CHLORINATION PARAMETER BASED ON DEEP LEARNING

RELATED APPLICATIONS

This patent application claims the benefit and priority of Chinese Patent Application No. 202310317484.1, filed with the China National Intellectual Property Administration on Mar. 29, 2023, the disclosure of which is incorporated by reference herein in its entirety for all purposes as part of the present application.

FIELD OF THE INVENTION

The present disclosure relates to the field of machine learning, and in particular to an automatic optimization system for a toluene chlorination parameter based on deep learning.

BACKGROUND OF THE INVENTION

Toluene chlorination is considered as important reaction in chemical industry. Particularly, chlorotoluene as a result of the toluene chlorination is an important fine chemical material and a widely used organic chemical intermediate. In recent years, for a number of novel medicines, pesticides, dyestuffs and the like, the chlorotoluene is taken as a starting material to produce the intermediate.

In the existing continuous toluene chlorination process, reaction parameters are adjusted manually according to a toluene mass fraction in the reaction. However, the manual adjustment is more cost-consuming, and cannot realize timely adjustment on the whole reaction parameters.

SUMMARY OF THE INVENTION

In view of the above problems, the present disclosure provides an automatic optimization system for a toluene chlorination parameter based on deep learning, including a toluene chlorination data acquisition module configured to acquire toluene chlorination data, a toluene chlorination data preprocessing module configured to perform preprocessing on the toluene chlorination data, the preprocessing including missing value filling and normalization, a toluene chlorination data division module configured to divide preprocessed toluene chlorination data into a training set sample and a validation set sample, a toluene chlorination deep belief network (DBN) construction module configured to construct a toluene chlorination DBN, a toluene mass fraction prediction module configured to predict a toluene mass fraction with the toluene chlorination DBN, a toluene mass fraction validation module configured to compare a predicted toluene mass fraction with a preset standard toluene mass fraction interval, carry out toluene chlorination normally if the predicted toluene mass fraction falls within the preset standard toluene mass fraction interval, or otherwise start a toluene chlorination parameter optimization module, and the toluene chlorination parameter optimization module provided with an expert solution database, and configured to control an actuator to adjust the chlorination according to the expert solution database.

As a preferred solution to the present disclosure, the preprocessing on the toluene chlorination data includes: acquiring toluene chlorination data, determining whether the toluene chlorination data at a present timepoint is missing, directly outputting the toluene chlorination data if the toluene chlorination data at the present timepoint is not missing, and filling a corresponding missing value of the toluene chlorination data at the present timepoint with toluene chlorination data at a previous timepoint if the toluene chlorination data at the present timepoint is missing; and performing the normalization on the toluene chlorination data by $$f(x) = \frac{x - x_{min}}{x_{max} - x_{min}},$$

where x is a value of a toluene chlorination data sample, $x_{min}$ is a minimum value in the toluene chlorination data sample, $x_{max}$ is a maximum value in the toluene chlorination data sample, and f(x) is a normalized value.

As a preferred solution to the present disclosure, the toluene chlorination data division module divides the preprocessed toluene chlorination data into the training set sample and the validation set sample according to 8:1.

As a preferred solution to the present disclosure, the toluene chlorination DBN is constructed as follows:

formation: constructing the toluene chlorination DBN based on a back propagation (BP) neural network, where the toluene chlorination DBN includes an input layer, three hidden layers, and an output layer; the hidden layers include a first hidden layer, a second hidden layer, and a third hidden layer; and the input layer and the first hidden layer are formed into a restricted Boltzmann machine (RBM) 1, the first hidden layer and the second hidden layer are formed into an RBM2, and the second hidden layer and the third hidden layer are formed into an RBM3;

training: individually performing unsupervised training on each of the RBM1, the RBM2 and the RBM3 in the toluene chlorination DBN with the training set sample, fully training the RBM1, fixing a weight and an offset between the input layer and the first hidden layer, taking an output value of the first hidden layer as an input value of the first hidden layer in the RBM2, fully training the RBM2, fixing a weight and an offset between the first hidden layer and the second hidden layer, taking an output value of the second hidden layer as an input value of the second hidden layer in the RBM3, fully training the RBM3, fixing a weight and an offset between the second hidden layer and the third hidden layer, taking an output value of the third hidden layer as an input of the output layer, and outputting a final result from the output layer; and validation: taking the weight and the offset obtained by fully training each of the RBM1, the RBM2 and the RBM3 as an initial weight and an initial offset of the toluene chlorination DBN, inputting the validation set sample to the input layer, and outputting a predicted toluene mass fraction through the toluene chlorination DBN, where when an error between the predicted toluene mass fraction and a toluene mass fraction in the validation set sample is not within a preset acceptable error range, a BP stage of the error is started, and the error modifies the weight and the offset of each layer through the output layer in an error gradient descending manner, and is back propagated to the hidden layer and the input layer one by one; and if the error between the predicted toluene mass fraction and the toluene mass fraction in the validation set sample is within the preset acceptable error range, no adjustment is required.

As a preferred solution to the present disclosure, the toluene mass fraction validation module provides a preset standard toluene mass fraction interval (0,a), validates a toluene mass fraction ω in the toluene chlorination with the preset standard toluene mass fraction interval, carries out the toluene chlorination normally if ω∈(0, a) and a<1, and controls the actuator to optimize the toluene chlorination through manual operation or according to the expert solution database if ω∈(a,1) and a<1.

As a preferred solution to the present disclosure, when the predicted toluene mass fraction does not fall within the preset standard toluene mass fraction interval, the toluene chlorination parameter optimization module compares output substandard toluene chlorination data with the expert solution database to obtain a corresponding toluene chlorination failure solution, and controls the actuator to adjust the reaction correspondingly according to the toluene chlorination failure solution.

In addition, the automatic optimization system for a toluene chlorination parameter based on deep learning further includes a method for controlling a node of the toluene chlorination DBN, specifically: setting each node in the toluene chlorination DBN as Xmn, specifically an nth node on an mth layer, and n=1, 2, 3 . . . N, m=1, 2, 3 . . . M; obtaining, when validating the toluene chlorination DBN with the validation set sample, an output value $Qx_{mn}$ of the node, specifically an output value of the nth node on the mth layer; obtaining a contribution ratio $W_{mn}$ of the node by $$W_{mn} = \frac{Q_{xmn}}{\sum Q_{xmn}};$$

comparing the contribution ratio $W_{mn}$ of the node with a preset contribution ratio threshold α; and closing the node if the contribution ratio $W_{mn}$ of the node is less than the preset contribution ratio threshold α, or otherwise performing no operation.

In addition, the automatic optimization system for a toluene chlorination parameter based on deep learning further includes an intelligent distributed control system (DCS), where the DCS includes manual operation and automatic operation; an infrared sensor and an automatic optimization switch are provided in a control room; when the infrared sensor senses a person in the control room, the automatic optimization switch can be turned off for the manual operation; and in other cases, the actuator is controlled according to a toluene chlorination failure solution in the expert solution database for automatic optimization.

The present disclosure achieves the following advantages:

The present disclosure can monitor each index through the sensor, quickly process the acquired toluene chlorination information and data, automatically predict the subsequent toluene mass fraction, determine whether to adjust the on-going toluene chlorination, realize automatic operation control, and optimize the reaction.

The automatic optimization system for toluene chlorination parameter provided by the present disclosure can realize the whole process including automatic detection, information processing, analysis and determination, operation control and expected goal implementation. While reducing manpower, the present disclosure improves the stability of the chemical reaction process, and improves the yield and purity of the target component.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWING

To describe the technical solutions in the embodiments of the present disclosure or in the prior art more clearly, the following briefly describes the drawings required for describing the embodiments or the prior art. Apparently, the drawings in the following description show some embodiments of the present disclosure, and those of ordinary skill in the art may still derive other drawings from these drawings without creative efforts.

FIG. 1 is a schematic structural view of an automatic optimization system for a toluene chlorination parameter based on deep learning according to Embodiment 1 of the present disclosure.

DETAILED DESCRIPTION

To make the objectives, technical solutions, and advantages of the present disclosure clearer, the present disclosure are further described in detail below with reference to the drawings and embodiments. It should be understood that the examples described herein are merely used to explain the present disclosure, rather than to limit the present disclosure. Those of ordinary skill in the art should understand that many technical details are proposed in each embodiment of the present disclosure to help the reader better understand the present disclosure. However, even without these technical details and various changes and modifications made based on the following embodiments, the technical solutions claimed in the present disclosure can still be realized.

Embodiment 1

Referring to FIG. 1, an automatic optimization system for a toluene chlorination parameter based on deep learning provided by Embodiment 1 of the present disclosure includes: a toluene chlorination data acquisition module, a toluene chlorination data preprocessing module, a toluene chlorination data division module, a toluene chlorination DBN construction module, a toluene mass fraction prediction module, a toluene mass fraction validation module, and a toluene chlorination parameter optimization module.

The toluene chlorination data acquisition module is configured to acquire toluene chlorination data.

It is to be noted that the present disclosure provides an advanced toluene chlorination tooling device, various high-performance controllers and actuators, and various perfect sensors, so as to completely acquire various data of toluene chlorination.

The toluene chlorination data preprocessing module is configured to perform preprocessing on the toluene chlorination data. The preprocessing includes missing value filling and normalization.

The preprocessing includes: Toluene chlorination data is acquired. Whether the toluene chlorination data at a present timepoint is missing is determined. The toluene chlorination data is directly output if the toluene chlorination data at the present timepoint is not missing. A corresponding missing value of the toluene chlorination data at the present timepoint is filled with toluene chlorination data at a previous timepoint if the toluene chlorination data at the present timepoint is missing. The normalization is performed on the toluene chlorination data by $$f(x) = \frac{x - x_{min}}{x_{max} - x_{min}},$$

where x is a value of a toluene chlorination data sample, $x_{min}$ is a minimum value in the toluene chlorination data sample, $x_{max}$ is a maximum value in the toluene chlorination data sample, and f(x) is a normalized value.

The toluene chlorination data division module is configured to divide preprocessed toluene chlorination data into a training set sample and a validation set sample.

Specifically, the toluene chlorination data division module divides the preprocessed toluene chlorination data into the training set sample and the validation set sample according to 8:1. The training set sample is used for training an RBM layer in a toluene chlorination DBN to obtain a weight of each layer. The validation set sample is used for validating a BP network, and propagating error information to each RBM layer from top to bottom through the BP network, thereby fine adjusting the whole toluene chlorination DBN.

The toluene chlorination DBN construction module is configured to construct the toluene chlorination DBN.

It is to be noted that the toluene chlorination DBN is constructed by formation, training and validation.

For the formation, the toluene chlorination DBN is constructed based on a BP neural network. The toluene chlorination DBN includes an input layer, three hidden layers, and an output layer. The hidden layers include a first hidden layer, a second hidden layer, and a third hidden layer. The input layer and the first hidden layer are formed into an RBM1. The first hidden layer and the second hidden layer are formed into an RBM2. The second hidden layer and the third hidden layer are formed into an RBM3.

For the training, unsupervised training is individually performed on each of the RBM1, the RBM2 and the RBM3 in the toluene chlorination DBN with the training set sample. The RBM1 is fully trained. A weight and an offset between the input layer and the first hidden layer are fixed. An output value of the first hidden layer is taken as an input value of the first hidden layer in the RBM2. The RBM2 is fully trained. A weight and an offset between the first hidden layer and the second hidden layer are fixed. An output value of the second hidden layer is taken as an input value of the second hidden layer in the RBM3. The RBM3 is fully trained. A weight and an offset between the second hidden layer and the third hidden layer are fixed. An output value of the third hidden layer is taken as an input of the output layer. A final result is output from the output layer.

For the validation, the weight and the offset obtained by fully training each of the RBM1, the RBM2 and the RBM3 are taken as an initial weight and an initial offset of the toluene chlorination DBN. The validation set sample is input to the input layer. A predicted toluene mass fraction is output through the toluene chlorination DBN. When an error between the predicted toluene mass fraction and a toluene mass fraction in the validation set sample is not within a preset acceptable error range, a BP stage of the error is started, and the error modifies the weight and the offset of each layer through the output layer in an error gradient descending manner, and is back propagated to the hidden layer and the input layer one by one. If the error between the predicted toluene mass fraction and the toluene mass fraction in the validation set sample is within the preset acceptable error range, no adjustment is required. In addition, the RBM network on each layer can only make the weight of the layer optimal to eigenvector mapping on the layer, rather than eigenvector mapping of the whole toluene chlorination DBN. In a BP stage of the toluene chlorination DBN, error information can be propagated to each RBM from top to bottom, thereby fine adjusting the whole toluene chlorination DBN. This also overcomes defects of local optimum and longtime of the toluene chlorination DBN due to the initial weight and the initial offset.

The toluene mass fraction validation module is configured to compare the predicted toluene mass fraction with a preset standard toluene mass fraction interval, directly output the predicted toluene mass fraction if the predicted toluene mass fraction falls within the preset standard toluene mass fraction interval, or otherwise start the toluene chlorination parameter optimization module.

It is to be noted that the toluene mass fraction validation module provides a preset standard toluene mass fraction interval (0,a), validates a toluene mass fraction ω in the toluene chlorination with the preset standard toluene mass fraction interval, carries out the toluene chlorination normally if $\omega \in (0, a)$ and $a<1$, and controls the actuator to optimize the toluene chlorination through manual operation or according to the expert solution database if $\omega \in (a, 1)$ and $a<1$.

The toluene chlorination parameter optimization module is provided with an expert solution database, and configured to control the actuator to adjust the chlorination according to the expert solution database.

It is to be noted that the toluene chlorination parameter optimization module performs curve fitting on the toluene chlorination data with a least square method. Different toluene chlorination failure solutions are input by an expert according to different cases. For example, at a timepoint when a mass fraction of toluene and a mass fraction of chlorine change little, and a mass fraction of a resultant is low in the toluene chlorination, this may be caused by an insufficient catalyst. Then, an amount of the catalyst to be added is calculated by the expert according to professional knowledge. At last, the failure and the failure solution are digitalized to construct the expert solution database. When the predicted toluene mass fraction does not fall within the preset standard toluene mass fraction interval, the toluene chlorination parameter optimization module compares output substandard toluene chlorination data with the expert solution database to obtain a corresponding toluene chlorination failure solution, and controls the actuator to adjust the reaction correspondingly according to the toluene chlorination failure solution.

In addition, it is further to be noted that a node of the toluene chlorination DBN is controlled. When the toluene chlorination DBN has an overhigh degree of fitting and is too specific, increasing the node for training to modify the weight is tedious. In view of this, the present disclosure optimizes the toluene chlorination DBN by reducing the node but not modifying the weight, specifically:

Each node in the toluene chlorination DBN is set as Xmn, namely an nth node on an mth layer, and n=1, 2, 3 . . . N, m=1, 2, 3 . . . M. An output value $Qx_{mn}$ of the node, namely an output value of the nth node on the mth layer, is obtained when the toluene chlorination DBN is validated with the validation set sample. A contribution ratio $W_{mn}$ of the node is obtained by $$W_{mn} = \frac{Q_{xmn}}{\sum Q_{xmn}}.$$

The contribution ratio of the node is compared with a preset contribution ratio threshold α. If the contribution ratio $W_{mn}$ of the node is less than the preset contribution ratio threshold α, a feature corresponding to the node is not referential, and the node is closed to prevent an overhigh degree of fitting of the toluene chlorination DBN. Or otherwise, no operation is performed.

In addition, an intelligent DCS is constructed. The DCS includes manual operation and automatic operation. An infrared sensor and an automatic optimization switch are provided in a control room. When the infrared sensor senses a person in the control room, the automatic optimization switch can be turned off for the manual operation. In other cases, the actuator is controlled according to an adjustment unit of the toluene chlorination DBN for the automatic operation. This can ensure real-time parameter monitoring and optimization, correctness of the optimization, and a yield and a purity of a target compound obtained by the toluene chlorination.

It should be understood that those of ordinary skill in the art can make improvements or transformations based on the above description, and all these improvements and transformations should fall within the protection scope of the appended claims of the present disclosure. The content not described in detail in the description belongs to the prior art well known to those skilled in the art.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An automatic optimization system for a toluene chlorination parameter based on deep learning, comprising:

one or more processors;

a memory to store instructions; and at least one sensor and an actuator coupled to the one or more processors;

wherein the one or more processors execute the instructions to perform operations comprising:

acquiring toluene chlorination data from the at least one sensor;

performing preprocessing on the toluene chlorination data, the preprocessing comprising missing value filling and normalization;

dividing the preprocessed toluene chlorination data into a training set sample and a validation set sample;

constructing a toluene chlorination deep belief network (DBN);

predicting a toluene mass fraction with the toluene chlorination DBN;

comparing a predicted toluene mass fraction with a preset standard toluene mass fraction interval; and carrying out toluene chlorination normally if the predicted toluene mass fraction falls within the preset standard toluene mass fraction interval, or otherwise controlling the actuator to adjust the chlorination according to an expert solution database provided in the system.

2. The automatic optimization system for a toluene chlorination parameter based on deep learning according to claim 1, wherein the preprocessing on the toluene chlorination data comprises:

acquiring toluene chlorination data;

determining whether the toluene chlorination data at a present timepoint is missing;

directly outputting the toluene chlorination data if the toluene chlorination data at the present timepoint is not missing, or filling a corresponding missing value of the toluene chlorination data at the present timepoint with toluene chlorination data at a previous timepoint if the toluene chlorination data at the present timepoint is missing; and performing the normalization on the toluene chlorination data by $$f(x) = \frac{x - x_{min}}{x_{max} - x_{min}},$$

where x is a value of a toluene chlorination data sample, $x_{min}$ is a minimum value in the toluene chlorination data sample, $x_{max}$ is a maximum value in the toluene chlorination data sample, and f(x) is a normalized value.

3. The automatic optimization system for a toluene chlorination parameter based on deep learning according to claim 1, wherein the preprocessed toluene chlorination data is divided into the training set sample and the validation set sample according to a ratio 8:1.

4. The automatic optimization system for a toluene chlorination parameter based on deep learning according to claim 3, wherein constructing the toluene chlorination DBN comprises:

formation: constructing the toluene chlorination DBN based on a back propagation (BP) neural network, wherein the toluene chlorination DBN comprises an input layer, three hidden layers, and an output layer; the hidden layers comprise a first hidden layer, a second hidden layer, and a third hidden layer; and the input layer and the first hidden layer are formed into a restricted Boltzmann machine (RBM) 1, the first hidden layer and the second hidden layer are formed into an RBM2, and the second hidden layer and the third hidden layer are formed into an RBM3;

training: individually performing unsupervised training on each of the RBM1, the RBM2 and the RBM3 in the toluene chlorination DBN with the training set sample, fully training the RBM1, fixing a weight and an offset between the input layer and the first hidden layer, taking an output value of the first hidden layer as an input value of the first hidden layer in the RBM2, fully training the RBM2, fixing a weight and an offset between the first hidden layer and the second hidden layer, taking an output value of the second hidden layer as an input value of the second hidden layer in the RBM3, fully training the RBM3, fixing a weight and an offset between the second hidden layer and the third hidden layer, taking an output value of the third hidden layer as an input of the output layer, and outputting a final result from the output layer; and validation: taking the weight and the offset obtained by fully training each of the RBM1, the RBM2 and the RBM3 as an initial weight and an initial offset of the toluene chlorination DBN, inputting the validation set sample to the input layer, and outputting a predicted toluene mass fraction through the toluene chlorination DBN, wherein when an error between the predicted toluene mass fraction and a toluene mass fraction in the validation set sample is not within a preset acceptable error range, a BP stage of the error is started, and the error modifies the weight and the offset of each layer through the output layer in an error gradient descending manner, and is back propagated to the hidden layer and the input layer one by one; and if the error between the predicted toluene mass fraction and the toluene mass fraction in the validation set sample is within the preset acceptable error range, no adjustment is required.

5. The automatic optimization system for a toluene chlorination parameter based on deep learning according to claim 4, wherein comparing the predicted toluene mass fraction with the preset standard toluene mass fraction interval, carrying out toluene chlorination normally if the predicted toluene mass fraction falls within the preset standard toluene mass fraction interval, or otherwise controlling the actuator to adjust the chlorination according to the expert solution database provided in the system comprises:

providing a preset standard toluene mass fraction interval (0,a);

validating a toluene mass fraction ω in the toluene chlorination with the preset standard toluene mass fraction interval; and carrying out the toluene chlorination normally if $\omega \in (0, a)$ and $a<1$, and controlling the actuator to optimize the toluene chlorination according to the expert solution database if $\omega \in (a, 1)$ and $a<1$.

6. The automatic optimization system for a toluene chlorination parameter based on deep learning according to claim 5, wherein when the predicted toluene mass fraction does not fall within the preset standard toluene mass fraction interval, controlling the actuator to adjust the chlorination according to the expert solution database provided in the system comprises:

comparing output substandard toluene chlorination data with the expert solution database to obtain a corresponding toluene chlorination failure solution; and controlling the actuator to adjust the reaction correspondingly according to the obtained toluene chlorination failure solution.

7. The automatic optimization system for a toluene chlorination parameter based on deep learning according to claim 6, further comprising controlling a node of the toluene chlorination DBN by:

setting each node in the toluene chlorination DBN as $X_{mn}$, specifically an nth node on an mth layer, and n=1,2, 3 . . . N, m=1,2,3 . . . M;

obtaining, when validating the toluene chlorination DBN with the validation set sample, an output value an output value $Q_{xmn}$ of the node, specifically an output value of the nth node on the mth layer;

obtaining a contribution ratio $W_{mn}$ of the node by $$W_{mn} = \frac{Q_{xmn}}{\sum Q_{xmn}};$$

comparing the contribution ratio $W_{mn}$ of the node with a preset contribution ratio threshold α; and closing the node if the contribution ratio $W_{mn}$ of the node is less than the preset contribution ratio threshold α, or otherwise performing no operation.

8. The automatic optimization system for a toluene chlorination parameter based on deep learning according to claim 7, further comprising:

an intelligent distributed control system (DCS), wherein the DCS comprises manual operation and automatic operation; and an infrared sensor and an automatic optimization switch provided in a control room;

wherein when the infrared sensor senses a person in the control room, the automatic optimization switch is turned off for the manual operation, or otherwise the actuator is controlled according to a toluene chlorination failure solution in the expert solution database for automatic optimization.

* * * * *